US008014650B1

(12) United States Patent
Sansone

(10) Patent No.: US 8,014,650 B1
(45) Date of Patent: Sep. 6, 2011

(54) FEEDBACK OF OUT-OF-RANGE SIGNALS

(75) Inventor: Philip Sansone, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1596 days.

(21) Appl. No.: 11/338,950

(22) Filed: Jan. 24, 2006

(51) Int. Cl.
| H04N 5/93 | (2006.01) |
| H04N 5/84 | (2006.01) |
| H04N 5/92 | (2006.01) |
| G05B 15/00 | (2006.01) |
| G06F 3/00 | (2006.01) |
| G06F 15/177 | (2006.01) |
| G10L 13/00 | (2006.01) |
| G10L 15/00 | (2006.01) |

(52) U.S. Cl. .......... 386/280; 386/334; 386/337; 700/83; 704/231; 704/258; 704/270; 715/700; 715/734

(58) Field of Classification Search .................. 386/52, 386/98, 125, E9.013, 64; 375/E7.024, E7.025, 375/E7.129; 700/83; 715/700, 734, 970; 704/231, 258, 270; 600/505, 526
See application file for complete search history.

(56) References Cited

U.S. PATENT DOCUMENTS

| 5,687,733 | A | * | 11/1997 | McKown | 600/505 |
| 5,861,882 | A | * | 1/1999 | Sprenger et al. | 715/700 |
| 7,054,541 | B2 | * | 5/2006 | Persoon | 386/52 |
| 7,617,106 | B2 | * | 11/2009 | Schramm | 704/270 |
| 2004/0240856 | A1 | * | 12/2004 | Yahata et al. | 386/98 |

* cited by examiner

*Primary Examiner* — Thai Tran
*Assistant Examiner* — Syed Y Hasan
(74) *Attorney, Agent, or Firm* — Robert C. Kowert; Meyertons, Hood, Kivlin, Kowert & Goetzel, P.C.

(57) ABSTRACT

Briefly, in accordance with one or more embodiments, relatively immediate feedback may be provided for out of range signals. Embodiments may include, subsequent to an edit of at least a portion of one or more received signals, compositing the one or more received signals to provide a composited signal including an edited portion corresponding to the edit. Embodiments may also include analyzing the composited signal to determine whether the edited portion of the composited signal exceeds a predefined range. Embodiments may also include generating an error indication in response to determining that the edited portion of the composited signal exceeds the predefined range. The compositing, the analyzing and the generating are completed during a time period less than a total playing time of the composited signal.

30 Claims, 4 Drawing Sheets

FEEDBACK OF OUT-OF-RANGE SIGNALS

BACKGROUND

Some processes for editing video and/or audio compilations may be inefficient. A user may have to view and/or review an entire composited group to determine if audio and/or video signals are out of a predefined range.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
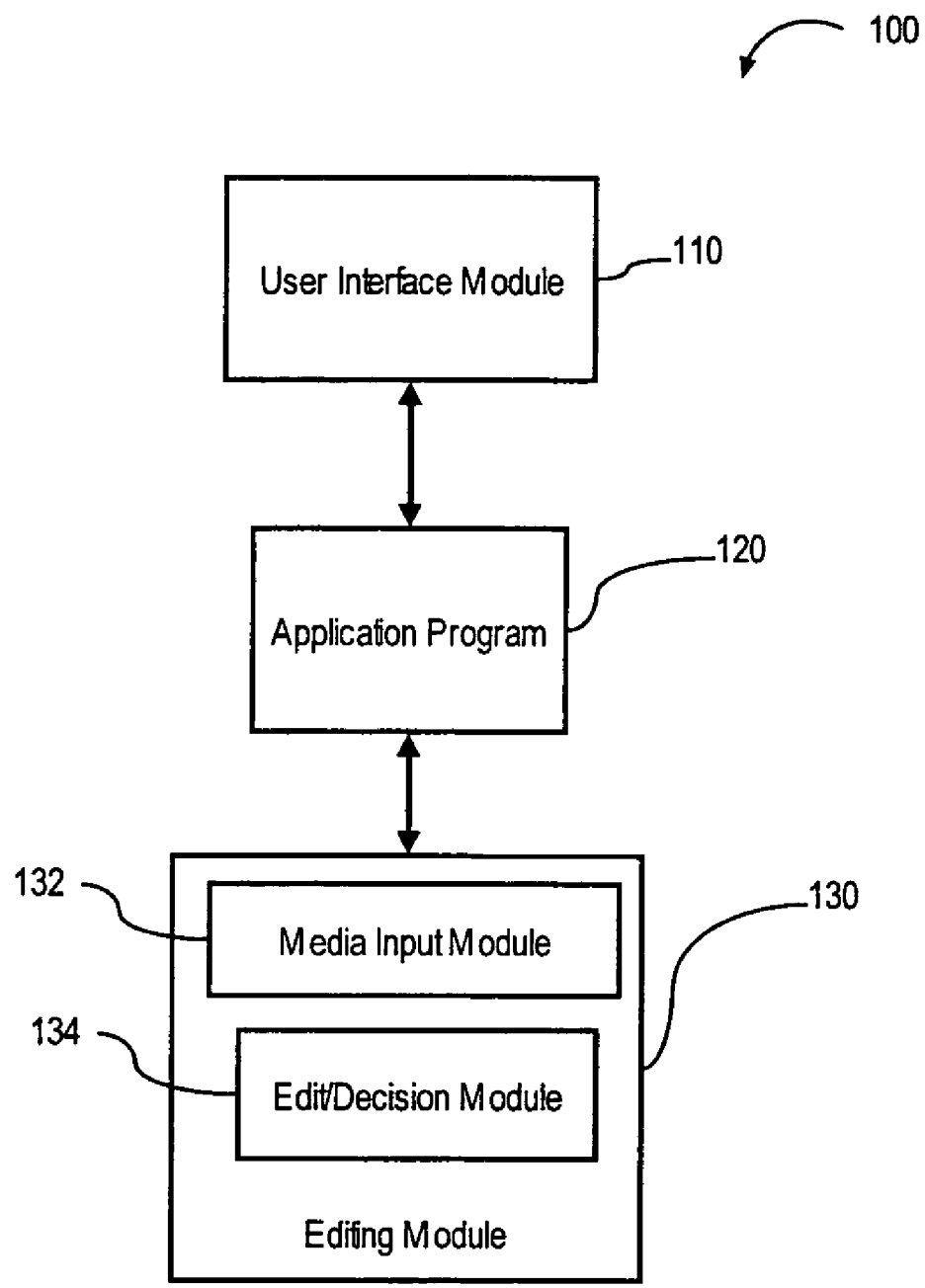
FIG. 1 is a block diagram of a system capable of executing feedback for editing in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description that follows are presented in terms of processes, programs and/or symbolic representations of operations on data bits and/or binary digital signals within a computer memory, for example. These process descriptions and/or representations may include techniques used in the data processing arts to convey the arrangement of a computer system and/or other information handling system to operate according to such programs, processes, and/or symbolic representations of operations.

A process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It may be convenient at times, principally for reasons of common usage, to refer to these signals as bits, values, elements, symbols, characters, terms, numbers and/or the like. However, these and/or similar terms may be associated with the appropriate physical quantities, and are merely convenient labels applied to these quantities.

Unless specifically stated otherwise, as apparent from the following discussions, throughout the specification discussion utilizing terms such as processing, computing, calculating, determining, and/or the like, refer to the action and/or processes of a computing platform such as computer and/or computing system, and/or similar electronic computing device, that manipulate and/or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include one or more apparatuses for performing the operations herein. Such an apparatus may be specially constructed for the desired purposes, or it may comprise a general purpose computing device selectively activated and/or reconfigured by a program stored in the device. Such a program may be stored on a storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing device, computing platform, and/or other information handling system. However, the computer program product may also be capable of being downloaded directly to the computing device, such as, but not limited to, a download over the Internet. This disclosure is intended to encompass a carrier wave format.

The processes and/or displays presented herein are not inherently related to any particular computing device and/or other apparatus. Various general purpose systems may be used with programs in accordance with the teachings herein, or a more specialized apparatus may be constructed to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, couple and/or coupled may mean that two objects are in communication with each other, and/or communicate with each other, such as two pieces of software, and/or hardware, or combinations thereof. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In one or more embodiments, an object may refer to an item that may be selected and/or manipulated, for example, shapes, pictures, images, text, and/or text boxes that may appear on a display as rendered by a computing platform coupled to the display. In one or more embodiments, the term render and/or raster may refer to displaying an object on a display coupled to a computing platform, and/or to manipulating the object on the display. In one or more embodiments, graphic may refer to a pictorial and/or image representation of an object, and in one or more alternative embodiments may refer to an object itself. In one or more embodiments, a graphic element may comprise a single and/or fundamental graphic object, and/or a portion thereof. In one or more embodiments, a letterform may comprise a shape and/or design of a letter of an alphabet. In one or more embodiments, a font may refer to a design for a set of characters and/or letters for printing and/or displaying.

In one or more embodiments, text may refer to letters and/or characters that may be manipulated and/or combined as words, lines, and/or pages. However, these are merely example definitions of the above terms, phrases, and/or concepts wherein other definitions may apply as well, and the scope of claimed subject matter is not limited in these respects. In one or more embodiments, to parse may refer to dividing computer code into elements that can be analyzed and/or identified. In one or more embodiments, file may refer to a collection of data, code, instructions, and/or other information that may be readable, accessible, and/or able to be acted on by a computing platform and/or the like.

In one or more embodiments, a format may refer to a predefined organizational structure for data, code, instructions, and/or other information that may be readable, accessible, and/or able to be acted on by a computing platform and/or the like. In one or more embodiments, a graphical user interface (GUI) may refer to a program interface that utilizes displayed graphical information to allow a user to control and/or operate a computing platform and/or the like. A pointer may refer to a cursor and/or other symbol that appears on a display screen that may be moved and/or controlled with a pointing device to select objects, and/or input commands via a graphical user interface of a computing platform and/or the like. A pointing device may refer to a device used to control a cursor, to select objects, and/or input commands via a graphical user interface of a computing platform and/or the like. Pointing devices may include, for example, a mouse, a trackball, a track pad, a track stick, a keyboard, a stylus, a digitizing tablet, and/or similar types of devices. A cursor may refer to a symbol and/or a pointer where an input selection and/or actuation may be made with respect to a region of/in a graphical user interface. In one or more embodiment, transient may refer to being in a state for a brief and/or temporary period of time, and/or passing with time and/or a temporary state of being. However, these are merely example definitions of terms relating to graphical user interfaces and/or computing platforms and/or the like, and the scope of claimed subject matter is not limited in this respect.

A system for providing feedback for out of range signals is shown in FIG. 1, at 100. In an embodiment, system 100 may include a user interface module 110. User interface module 110 may be capable of receiving inputs from a user and providing outputs to the user. In this embodiment, system 100 may include an application program 120. Objects and/or indicators and/or other data may be rendered by application program 120 utilizing user interface module 110. User interface module 110 may be utilized by application program 120 to indicate to a user that a received signal may be outside a predefined range, such as when a user is editing audio and/or video signals, and/or combinations thereof, among others.

A current process may include compositing audio, video, and/or audio/video signals. A user may then view and/or perceive the entire composition to determine if any signal is out of a predefined range, such as out of the audible and/or visual range of a human. In this example, this process may increase time utilized in the editing process. In an embodiment, a way to decrease editing time may comprise allowing an editing module 130, which may have more information as to the composited signals, to analyze the signal to determine if any portion of the composition is outside of a predefined range. Similarly, the editing module 130 may also determine if there are disjointed and/or uneven portions of the composition, and alert the user of these abnormalities.

In an embodiment, editing module 130 may be capable of receiving one or more signals, compositing the signals, and analyzing the received signals, and/or the composited signal, and/or combinations thereof, to determine if the signal is outside a predefined range. Editing module 130 may also be configured to indicate that the signal is outside a predefined range, as well as where the signal is outside the predefined range. Edit module 130 may also be capable of parsing the signal. Parsing may include parsing the signal in audio, video, and other components, among many others, and/or combinations thereof.

Editing module 130 may also be capable of editing the composited signal. The composited signal may be displayed in a time-line format. This format may also include a graphical representation of the composited signal, as well as the predefined range. If the signal is outside of the predefined range, the user may be alerted. Furthermore, the exact location of the signal outside range may be indicated.

In an embodiment, the signals received may be audio/visual signals, other types of signals, and/or combinations thereof. The indication of a signal outside range may be audio, visual, graphical, and/or other indications, and/or combinations thereof. The indications may also include the use of colors of the out of range signals, among many others.

In an embodiment, editing module 130 may include a media input module 132. Media input module 132 may be capable of receiving signals, and transmitting signals to an edit/decision module 134. Edit/decision module 134 may be capable of receiving signals, and analyzing the signal to determine if the signals are within a predefined range. Edit/decision module 134 may also be capable of editing the signal to alleviate out of range signals, among many other possible editing functions.

Figure 2:
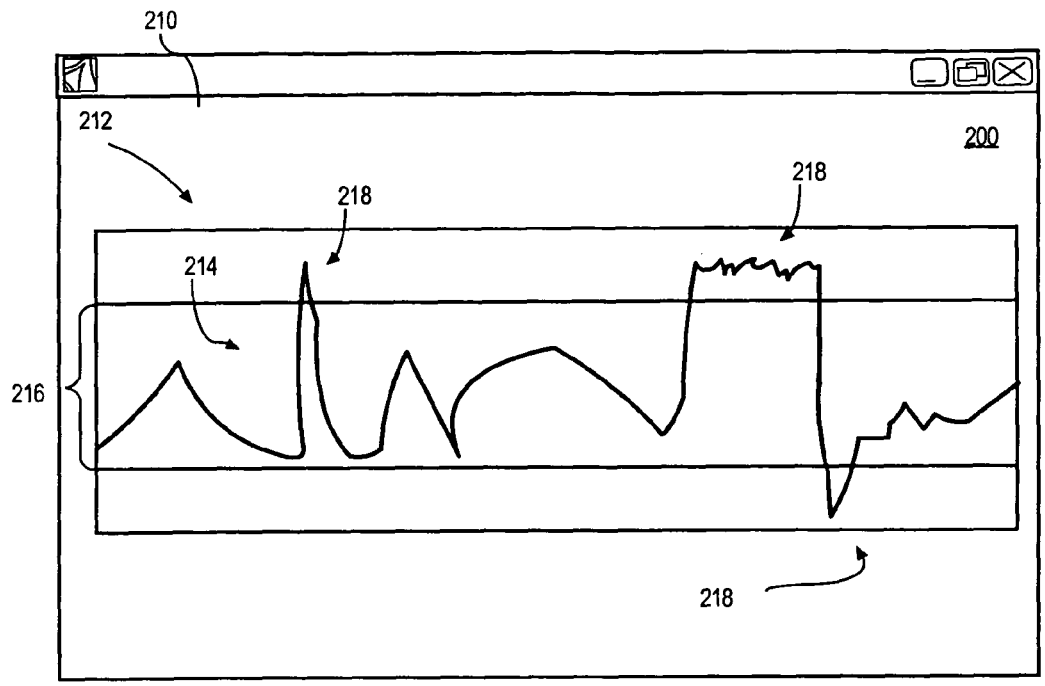
FIG. 2 is a diagram of a file illustrating a program, and objects in accordance with one or more embodiments.
Figure 3:
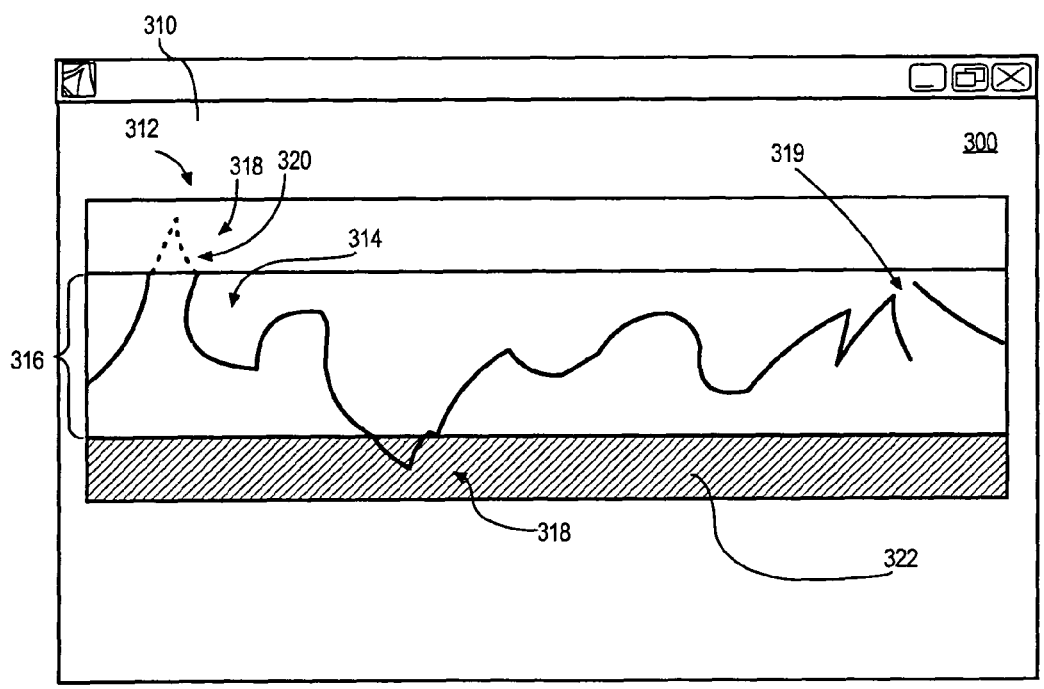
FIG. 3 is a diagram of a file illustrating a program, and objects in accordance with one or more embodiments.

Referring now to FIG. 2, a diagram of a file including one or more objects in accordance with one or more embodiments will be discussed. As shown in FIG. 2, file 200 may comprise a document capable of being displayed in and/or controlled by program 210. In one embodiment, program 210 may comprise an Adobe® Encore DVD® type program, Adobe® After Effects® type program, Adobe® Audition® type program, Adobe® Premiere® type program, and/or Adobe® Photoshop® type program, and/or combinations thereof, available from Adobe Systems Incorporated of San Jose, Calif., USA, and file 200 may comprise an Adobe® Portable Document Format (PDF) type file, among many others, although the scope of claimed subject matter is not limited in these respects. In one embodiment, document 200 may be authored and/or created in a page description language (PDL), which refers to a language for describing a layout and/or contents of a page to be displayed and/or printed. Such a page description language may comprise, for example, Adobe® PostScript® program available from Adobe Systems Incorporated. PostScript®, for example, describes a page in terms of page objects including textual objects and/or graphical objects such as lines, arcs, and/or circles. PostScript® program may be used, for example, to create Portable Document Format type files, although the scope of claimed subject matter is not limited in this respect.

In another embodiment, program 210 may comprise a word processor and/or a text processor, for example Microsoft® Word available from Microsoft Corporation of Redmond, Wash., USA, and file 200 may comprise a Microsoft® Word type file, although the scope of claimed subject matter is not limited in this respect. In yet another embodiment, program 210 may comprise a web browser to open and/or display web pages, and file 200 may comprise a Hyper Text Markup Language (HTML) type file. In such an embodiment, program 210 may comprise, for example, a Microsoft® Internet Explorer web browser available from Microsoft Corporation, or alternatively may comprise, for example, a Firefox web browser available from the Mozilla Foundation of Mountain View, Calif., USA, although the scope of claimed subject matter is not limited in this respect. In yet another embodiment, program 210 may comprise a signal editing and/or analyzing program capable of editing audio, visual, and/or other signals, and/or combinations thereof. Program 210 and file 200 may comprise many other types and formats including, but not limited to, many other types of graphical or any other type of program that displays objects and/or other data. This disclosure is not limited with respect to the program or file.

In an embodiment, a file 200 may include information capable of being displayed by an object 212. In an embodiment, object 212 may be a graphical display, however, other types of objects are intended to be encompassed by the scope of the present disclosure. Displayed within object 212 may be a representation of a signal 214. Signal 214 may be an incoming signal and/or a composited signal, and/or combinations thereof. In an embodiment, the signal may correspond to an audio, video, audio/video, image, or other type of signal, and/or combinations thereof. In this embodiment, signal 214 is shown as a function of time, in a time-line type manner. However, the scope of this disclosure is not limited in this respect. Many other display types and/or formats may be utilized without straying from the spirit and scope of this disclosure.

Object 212 may also be capable of displaying a predefined range 216. Predefined range 216 may be previously determined by a user or in another manner. Predefined range 216 may be entered by a user, and/or a default range, and/or other methods, and/or combinations thereof. With this configuration, out of range signals 218 may be easily indicated. Many different variables may be utilized as the predefined range, such as but not limited to, frequency, amplitude, intensity, saturation, and/or many other variable, and/or combinations thereof. Furthermore, many variables may be considered when determining the range. These variables may be, but are not limited to, the capability of the hardware and/or software, government regulations, computing and/or memory capacity, visual and/or audible ranges perceivable by a human, color among many other variables, and/or combinations thereof.

Signal 214 may not be a portion of a file and may be received through an input device. Furthermore, object 212 may be configured to display an entire signal such that the user may ensure that the entire signal is within range 216. Object 212 may be configured to display a portion of the signal, and be capable of editing the signal.

Predefined range 216 may also depend, at least partially, upon National Television System Committee (NTSC) video standards. NTSC standards may be very strict, and may limit the number and type of colors that may be used. These standards may not allow highly saturated colors, as distortion may occur. There may be no way for a user to know they have colors outside the NTSC's standards, as the compilation may look fine on a particular monitor, but still exceed the acceptable range.

Furthermore, predefined range 216 may also depend, at least in part upon Institute of Radio Engineers (IRE) units. IRE units may be the scale defined by the Institute of Radio Engineers to measure the amplitude of a video signal. The acceptable broadcast range for IRE units may be between 7.5 IRE units and 100 IRE units. Similarly, predefined range 216 may also depend, at least in part upon an acceptable audio range. The audio range may include, but is not limited to, audio amplitude and frequency, among many others, and/or combinations thereof. These limitations may not be apparent to a user. Furthermore, a user may have to view and/or listen to the entire compilation to determine if any out of range signals exist.

Signal 214 may include out of range signals 218 that are outside predefined range 216. In an embodiment, the predetermined range may include no signal. The user may be alerted to signals outside of predefined range 216 visually, as in this embodiment, or many other ways, including but not limited to, audio, graphical, and/or combinations thereof. The indication of an out of range signal may occur relatively immediately, as the range is predefined, and may be applied fairly rapidly to determine if a portion of a signal is out of range. Relatively immediately may be within a certain amount of time that is less than viewing the entire compilation. Furthermore, this time period may be, but is not limited to , 30 seconds or less. This period may increase or decrease based at least in part upon the signal analyzed, and the size of the signal, among many other considerations, and/or combinations thereof. Out of range signals 218 may rise above and/or drop below predefined range 216, as shown in FIG. 2.

In an embodiment, a file 300 may include an object 312. In an embodiment, object 312 may be a graphical display, however, other types of objects are intended to be encompassed by the scope of the present disclosure. Displayed within object 312 may be a representation of a signal 314. Signal 314 may be an incoming signal and/or a composited signal, and/or combinations thereof. In this embodiment, signal 314 is shown as a function of time, in a time-line type manner. However, the scope of this disclosure is not limited in this respect. Many other display types and/or formats may be utilized without straying from the spirit and scope of this disclosure.

Object 312 may also be capable of displaying a predefined range 316. Predefined range 316 may be previously determined by a user or in another manner. With this configuration, out of range signals 318 may be easily indicated. Out of range signals 318 and 319 may exceed and/or drop below predefined range 316, as well as disjoints and/or non-continuous, at 319. Non-contiguous signals may cause the video, audio, and/or other type of signals to be disjointed, which may cause irregular and/or disjointed when viewed, heard, and/or other perceptions.

As shown in this embodiment, indications 320 and 322, and may alert the user to out of range signals 318. Indications may include, but are not limited to, the portion of the signal out of range may appear as a dashed signal, a different color signal, above and/or below the predefined range flashing and/or different color, and audio indication, and/or other indications, and/or combinations thereof. One type of indication may show the out of range signal 320 differently than an in range signal. Furthermore, another type of indication may show the area above or below the predefined range that an out of range signal occurs, such as 322. Many other indications may be used either alone, and/or in combinations, without straying from the spirit and scope of the present disclosure.

The application program may also suggest and/or automatically correct the out of range signals. The correcting may be accomplished at least in part automatically, and may be based at least in part upon the predefined algorithm. In one embodiment, out of range colors may be automatically corrected to the closest possible legal color. Other out of range signals may be similarly autocorrected to the nearest, best, and/or closest allowable signal, and/or combinations thereof.

Figure 4:
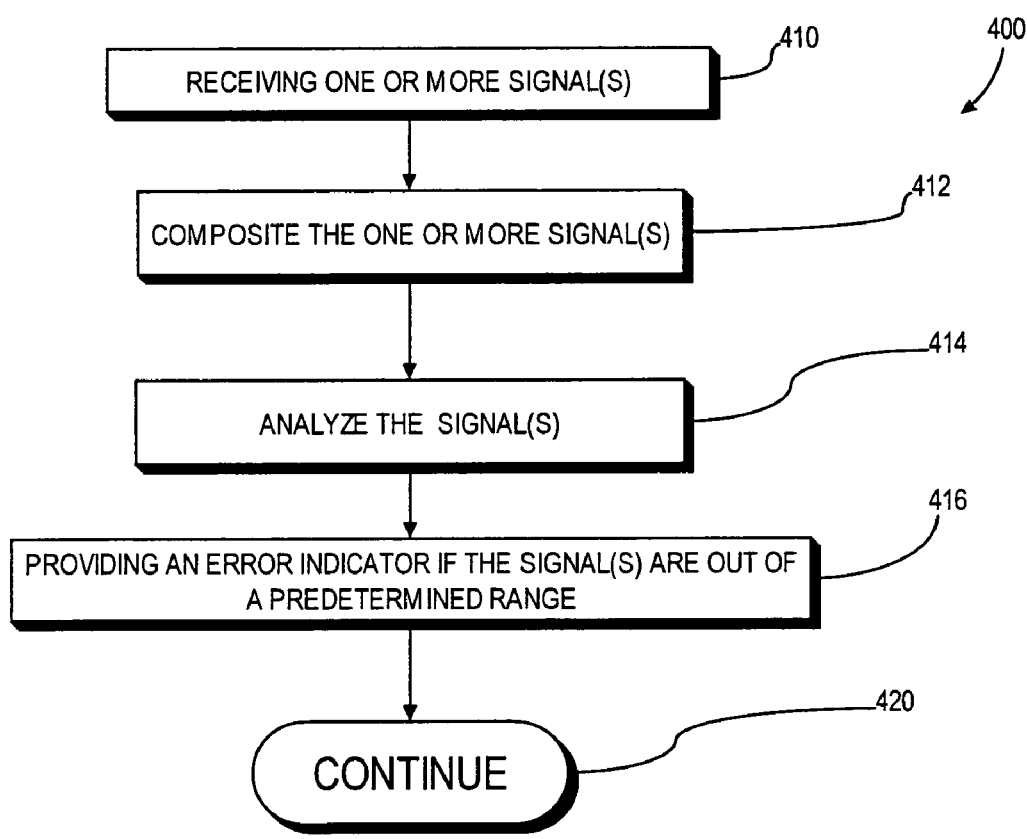
FIG. 4 is a flow diagram of a process for feedback for out of range signals in accordance with one or more embodiments.

Referring now to FIG. 4, a flow diagram of a process generally for an out of range signal feedback method in accordance with one or more embodiments will be discussed. In one or more embodiments, process 400 may include blocks 410 through 420, more blocks and/or fewer blocks than shown in FIG. 4. Furthermore, the order of blocks 410 through 420 is merely one order of blocks, wherein process 400 may include one or more alternative orders of blocks 410 through 420, and the scope of claimed subject matter is not limited in this respect.

Receiving a signal may be accomplished at block 410. Editing module 130 may receive one or more signals. The one or more signals may be composited at 412. Compositing the signals 412 may include, but is not limited to, ordering the signals, adding, overlapping, and/or many other types of compositing, and/or combinations thereof. Furthermore, compositing the one or more signals may include only one signal, such as but not limited to, the first signal received, among many other one signal compositions, and/or combinations thereof.

The signals may be analyzed at 414. The signals analyzed may include the individual signals as they are received, as well as the composited signal, and/or combinations thereof. This may alert a user if an incoming signal is outside of a predefined range, at 416. The status of the individual signals may or may not be of concern to the user as the user may only be concerned with the final compilation. Furthermore, an incoming signal may be within the predefined range, but when composited with other signals, may create an out of range signal within the compilation. As described above, the indication to the user of an out of range signal may be of many different means. The process then continues at 420.

Figure 5:
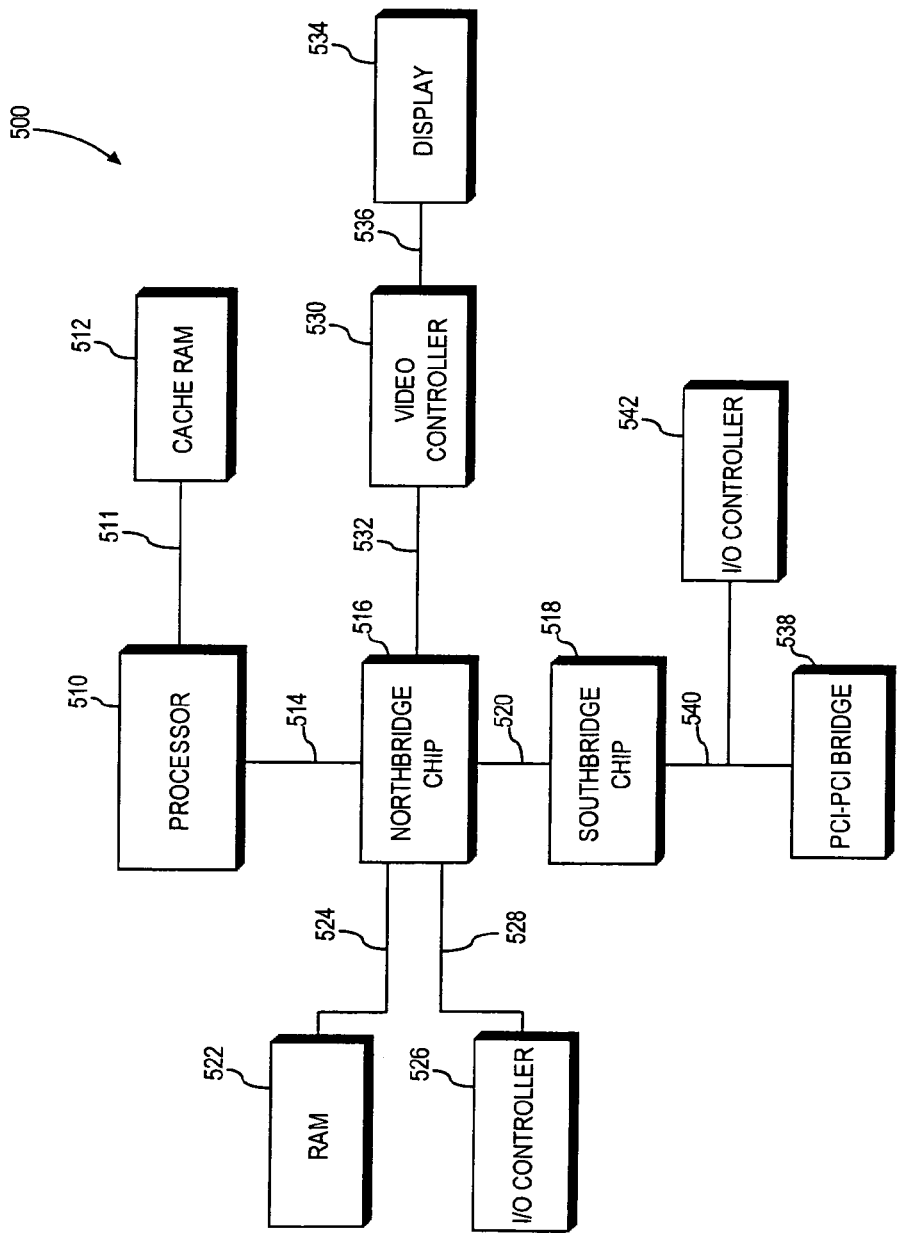
FIG. 5 is a block diagram of a computing platform capable of executing feedback for out of range signals in accordance with one or more embodiments.

Referring now to FIG. 5, a block diagram of a computing platform capable of providing feedback of out of range signals in accordance with one or more embodiments will be discussed. It should be noted that computing platform 500 of FIG. 5 is merely one type of computing platform, and other computing platforms having more and/or fewer and/or different components than shown in FIG. 5 may be implemented, and the scope of claimed subject matter is not limited in this respect. In one or more embodiments, computing platform 500 may be utilized to implement process 400 in whole and/or using more and/or fewer blocks than shown in FIG. 4, and the scope of claimed subject matter is not limited in this respect. Computing platform 500 may include processor 510 coupled to cache random access memory (RAM) 512 via back side bus 511. Processor 510 may also couple to a chipset that includes Northbridge chip 516 via front side bus 514, and also to Southbridge chip 518 via bus 520. In one embodiment, Northbridge chip 516 in general may be utilized to connect a processor to memory, to an input/output bus, to a video bus, and to Level 2 cache, although the scope of claimed subject matter is not limited in this respect.

In one embodiment, Southbridge chip 518 may be utilized to control input/output functions, the basic input/out system (BIOS), and interrupt control functions of Integrated Drive Electronics (IDE) devices, such as hard disks or compact disk read-only memory (CD-ROM) devices or the like, although the scope of claimed subject matter is not limited in this respect. Random access memory (RAM) 522 may couple to Northbridge chip 516 via main memory bus 524, and input/output (I/O) controller 526 may also couple to Northbridge chip 516 via I/O bus 528. In one embodiment, I/O controller 526 and I/O bus 528 may be in compliance with a Small Computer Systems Interface (SCSI) specification such as the American National Standards Institute (ANSI) X3.131-1994 SCSI-2 specification, although the scope of claimed subject matter is not limited in this respect. In an alternative embodiment, I/O controller 526 and I/O bus 528 may be in compliance with a Peripheral Component Interconnect (PCI) bus, although the scope of claimed subject matter is not limited in this respect.

Video controller 530 may couple to Northbridge chip 516 via video bus 532, which in one embodiment may comprise an Accelerated Graphics Port (AGP) bus, although the scope of claimed subject matter is not limited in this respect. Video controller 530 may provide video signals to an optionally coupled display 534 via display interface 536 which in one embodiment may comprise a Digital Visual Interface (DVI) in compliance with a standard promulgated by the Digital Display Working Group, although the scope of claimed subject matter is not limited in this respect. Southbridge chip 518 may couple to a peripheral component interconnect to peripheral component interconnect (PCI-PCI) bridge 538 via input/output bus 540, which may in turn couple to I/O controller 542 to control various peripheral devices such as Universal Serial Bus (USB) devices, or devices compatible with an Institute of Electrical and Electronics Engineers (IEEE) 1394 specification, although the scope of claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to adaptive feedback for out of range signals and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    performing by one or more computers:
        subsequent to a user-specified audio or video edit of at least a portion of one or more received signals representing audio or video:
            compositing the one or more received signals to provide a composited signal including an edited portion dependent on said edit; wherein the composited signal, including the edited portion, represents audio or video;
            analyzing the composited signal to determine whether the edited portion of the composited signal exceeds a predefined range; and
            generating an error indication in response to determining that the edited portion of the composited signal exceeds the predefined range;

wherein said compositing, said analyzing and said generating are completed during a time period less than a total playing time of the composited signal.

2. The method of claim 1, further comprising parsing the received one or more signals.

3. The method of claim 1, further comprising correcting, at least in part automatically, the out of range portion of the composited signal.

4. The method of claim 1, wherein the one or more received signals comprises an audio/video signal.

5. The method of claim 1, wherein said error indication is a graphical indication.

6. The method of claim 5, wherein the method comprises generating the composited signal as part of a graphical timeline on a display, wherein generating the error indication comprises graphically indicating an error in a portion of the graphical timeline that corresponds to said edited portion.

7. The method of claim 1, wherein said error indication is a visual indication.

8. The method of claim 1, wherein said error indication is an audio indication.

9. The method of claim 1, wherein the method comprises analyzing the composited signal to determine that an amplitude of said edited portion of the composited signal exceeds a predefined amplitude range.

10. The method of claim 1, wherein the method comprises analyzing the composited signal to determine that a frequency of said edited portion of the composited signal exceeds a predefined frequency range.

11. The method of claim 1, wherein the method comprises analyzing the composited signal to determine that a visual range of said edited portion of the composited signal exceeds a predefined human visual range.

12. The method of claim 1, wherein the method comprises analyzing the composited signal to determine that a visual range of said edited portion of the composited signal exceeds a predefined human audio range.

13. The method of claim 1, wherein said compositing, said analyzing and said generating are performed in response to said edit.

14. An apparatus, comprising:
a user interface capable of receiving inputs from a user, and receiving and displaying indications;
an editing module configured to:
communicate with the graphical user interface,
subsequent to a user-specified audio or video edit of at least a portion of one or more received signals representing audio or video:
composite the one or more received signals to provide a composited signal including an edited portion dependent on said edit; wherein the composited signal, including the edited portion, represents audio or video,
analyze the composited signal to determine whether the edited portion of the composited signal exceeds a predefined range,
generate an error indication in response to determining that the edited portion of the composited signal exceeds the predefined range, and
send the error indication to the user interface
wherein analysis of the composited signal, generation of the error indication and sending the error indication are completed during a time period less than a total playing time of the composited signal.

15. The apparatus of claim 14, wherein the user interface is further capable of displaying the composited signal.

16. The apparatus of claim 14, wherein the editing module comprises a media input module capable of processing the composited signal.

17. The apparatus of claim 14, wherein the editing module is further capable of editing the composited signal.

18. The apparatus of claim 14, wherein the editing module is further capable of correcting, at least in part automatically, the out of range portion of the composited signal.

19. The apparatus of claim 14, wherein the composited signal comprises an audio/video signal.

20. The apparatus of claim 14, wherein the error indication comprises a graphical indication.

21. The apparatus of claim 14, wherein the editing module is configured to determine that the edited portion of the composited signal exceeds a predefined amplitude range.

22. The apparatus of claim 14, wherein the editing module is configured to determine that the edited portion of the composited signal exceeds a predefined frequency range.

23. The apparatus of claim 14, wherein the editing module is configured to determine that the edited portion of the composited signal exceeds a predefined human visual range.

24. The apparatus as claimed in claim 14, wherein the editing module is configured to determine that the edited portion of the composited signal is within a predefined human audio range.

25. The apparatus of claim 14, wherein said user interface is configured to display the composited signal as part of a graphical timeline, wherein the user interface is configured to graphically indicate an error in a portion of the graphical timeline that corresponds to said edited portion.

26. An article comprising: a non-transitory computer-readable storage medium having instructions executable by a computing platform to:
subsequent to a user-specified audio or video edit of at least a portion of one or more received signals representing audio or video:
composite the one or more received signals to provide a composited signal including an edited portion dependent on said edit; wherein the composited signal, including the edited portion, represents audio or video;
analyze the composited signal to determine whether the edited portion of the composited signal exceeds a predefined range; and
generate an error indication in response to determining that the edited portion of the composited signal exceeds the predefined range;
wherein said compositing, said analyzing and said generating are completed during a time period less than a total playing time of the composited signal.

27. The article of claim 26, wherein said instructions are further executable to display the composited signal.

28. The article of claim 26, wherein said instructions are further executable to edit the composited signal.

29. The article of claim 26, wherein to analyze the composited signal the instructions are executable to determine whether the composited signal is within a predefined amplitude or frequency range.

30. The article of claim 26, wherein the instructions are executable to display the composited signal as part of a graphical timeline and graphically indicate an error in a portion of the graphical timeline that corresponds to said edited portion.

* * * * *